(12) United States Patent
Oakeson et al.

(10) Patent No.: US 6,398,117 B1
(45) Date of Patent: Jun. 4, 2002

(54) METHOD AND SYSTEM FOR COMBINING BAR CODES OF DIFFERENT ENCODING DIMENSIONS

(75) Inventors: Kenneth L. Oakeson, Boise, ID (US); Izhak Baharav, Palo Alto, CA (US)

(73) Assignee: Hewlett-Packard Co., Palo Alto, CA (US)

( * ) Notice: Subject to any disclaimer, the term of this patent is extended or adjusted under 35 U.S.C. 154(b) by 0 days.

(21) Appl. No.: 09/483,646

(22) Filed: Jan. 14, 2000

(51) Int. Cl.$^7$ ................................................ G06K 19/06
(52) U.S. Cl. ........................................ 235/494; 235/456
(58) Field of Search ........................... 235/494, 462.04, 235/462.1, 456; 283/81, 72

(56) References Cited

U.S. PATENT DOCUMENTS

| | | | | |
|---|---|---|---|---|
| 5,298,731 A | * | 3/1994 | Ett | 235/494 |
| 5,798,513 A | * | 8/1998 | Ackley | 235/462 |
| 5,959,285 A | * | 9/1999 | Schuessler | 235/462.04 |
| 6,032,861 A | * | 3/2000 | Lemelson et al. | 235/456 |

OTHER PUBLICATIONS

Hewlett–Packard Co.; "Elements of a Bar Code System", Application Note 1013,; 7/96.

www.adams1.com; BarCode 1 "Site Contents Page," "Pre–Printed Bar Code Labels Page," "Bar Code Readers Page," "2–Dimensional Bar Code Page," "A Web of Information About Bar Code," "Universal Product Code (UPC) and EAN Article Numbering Code (EAN) Page," "Plessey Code Specification Page," "Interleaved 2 of 5 Specification Page," "Code 39 Specification Page," "Code 128 Specification Page,"; Aug. 13, 1999.

www.lascofittings.com; "Decode the Bar Code!"; Aug. 13, 1999.

www.barcodeman.com; Altek Instruments "Codabar Specification"; Aug. 13, 1999.

www.hp.com; Hewlett–Packard "Codabar"; Aug. 13, 1999.

escher.cs.ucdavis.edu:1024/CS15/scanner.html; Aug. 13, 1999.

\* cited by examiner

*Primary Examiner*—Karl D. Frech
*Assistant Examiner*—Ahshik Kim (57) ABSTRACT

A method for printing barcode, comprising the steps of obtaining a 1D barcode for an area of a medium; obtaining a 2D bar code; combining the 1D and 2D bar codes in the area to overlap at least in part; and printing the combination of the 2D barcode with the 1D barcode in the area of the medium.

33 Claims, 10 Drawing Sheets

Encoding for the letter 'T'  Encoding for 'h'

METHOD AND SYSTEM FOR COMBINING BAR CODES OF DIFFERENT ENCODING DIMENSIONS

BACKGROUND OF THE INVENTION

The present invention relates generally to bar code printing, and more particularly to bar code scanners and printers that can combine 1D with higher dimension bar codes in a specific area, and then detect and utilize those bar codes.

Bar code technology provides an accurate, easy, and inexpensive method of data storage and data entry for computerized information management systems. A properly designed bar code system can offer substantial improvements in productivity, traceability, and materials management, thereby yielding significant cost savings.

Typically, data is extracted from a 1D bar code symbol with an optical scanner that develops a logic signal corresponding to the difference in reflectivity of the printed bars and the underlying media (spaces). The serial data stored in the symbol is retrieved by scanning over the printed bars and spaces with a smooth, continuous motion. This motion can be provided by an operator moving a hand-held wand, by a rotating mirror moving a collimated beam of light, or by an operator or system moving the symbol past a fixed beam of light. The logic signal representing the bars and spaces supplied by the scanner is translated from a serial pulse stream into computer readable data by a decoder.

As the name implies, most bar codes comprise a series of black and light bars printed in accordance with a unique code that contains information across one dimension, so that data may be represented.

Multi-dimensional bar codes are also in use. For example, two-dimensional (2D) bar codes comprise stacked symbology or multi-row code. 2D bar code also refers to matrix code, which is formulated based on the position of black spots within a matrix. Each black element is the same dimension and it is the position of that element that codes the data.

Ordinary 1D bar code is "vertically redundant," meaning that the same information is repeated vertically. The heights of the bars can be truncated without any loss of information. However, the vertical redundancy allows a symbol with printing defects, such as spots, or voids, to still be read and decoded. For such codes, the higher the bar height, the more probability that at least one path along the bar code will be readable.

In contrast, a 2D code stores information along the height as well as the length of the symbol. Most 2D codes use check words to insure accurate reading. 2D code systems are practical where moving beam laser scanners, charge coupled device (CCD) scanners, and other comparable devices are available. 2D codes can also be read with hand held moving beam scanners by sweeping the horizontal beam down the symbol. However, this way of reading such a 2D symbol by sweeping a contact wand across the symbol has the normal criticality aspects of speed of sweep, resolution of the scanner, and symbol/reader distance.

2D codes were initially developed for applications where only a small amount of space was available for an automatic 1D symbol. However, with increased density of information storage with 2D and higher bar codes, the number of applications for such bar codes is multiplying. As an example of the advantages available from using 2D bar encoding, it is possible in the direct mail field to use 2D codes to store the name, address, and demographic information on the direct mail business reply cards. This larger amount of data in the 2D coding avoids the requirement to reference a remote database, thereby saving significant operational time. More specifically, in such direct mail applications, typically there is less than a 2% return from the mailing. If the return card is only coded with a reference number or access code to a remote database, the few returned cards must be checked against a very large database of potentially millions of names. This checking operation can be quite expensive in computer time. However, if all of the important information is printed in the 2D code at the time the mailing label is printed, then there is very little additional cost, and a potential for great savings when the cards are returned, since the time and expense necessary to access the remote database is avoided. Similar savings can occur in field service applications where servicing data may be stored in a 2D symbol on the equipment. The field engineer uses a portable reader to obtain the information, rather than dialing up the home offices remote computer.

From the above, it can be seen that 1D bar codes can be read with inexpensive bar code scanners that use a moving or a fixed beam and are traditionally used in applications such as product packaging. In contrast, 2D bar codes are often read by page scanners that use a CCD or CIS element and have a higher data density than one dimensional bar codes, but may impose limitations based on their size or location.

A significant problem occurs when some of the bar code readers that will be utilized to read a bar code from a particular item are 1D bar code readers, while other bar code readers are 2D or higher dimensional bar code readers, and are designed to extract extensive amounts of information from the 2D bar code to thereby avoid reference to a remote database. In this instance, it is necessary to have one location on the item for the 1D bar code and a second separate location for the 2D bar code. However, this set up is disadvantageous because it requires two bar code printings. More importantly, it is disadvantageous because it requires two separated spaces on the item, i.e., a space for the 1D bar code and a space for the 2D or higher dimensioned bar code. In instances where the spacing on the item is severely limited, this is a major disadvantage. Additionally, these two separate locations for the bar codes inherently require the ability to locate these two separate locations on the item and to read those locations.

SUMMARY OF THE INVENTION

Briefly, the present invention comprises a method for printing barcode, comprising the steps of: obtaining a 1D barcode for an area of a medium; obtaining a 2D bar code; combining the 1D and 2D bar codes in the area to overlap at least in part; and printing the combination of the 2D barcode with the 1D barcode in the area of the medium.

In a further aspect of the invention, the 2D bar code obtaining step comprises the step of selecting a 2D barcode for combining with at least a portion of the 1D barcode in the area of the medium based on a reflectance of at least one of a bar of the 1D barcode after the 2D barcode is combined with at least a portion of the 1D barcode bar, and a space of the 1D barcode after the 2D barcode is combined with at least a portion of the 1D barcode space, relative to a threshold reflectance.

In a yet further aspect of the invention, the method includes the steps of: representing a first amount of data by the 1D barcode; and, representing a second amount of data, which second amount is larger than the first amount, by the 2D barcode.

In a further aspect of the present invention, the reflectance in the selecting a 2D barcode step is determined for an addition of the 2D barcode to at least a portion of the bar or space of the 1D barcode.

In a further aspect of the present invention, the reflectance in the selecting a 2D barcode step is determined for the 2D barcode replacing at least a portion of the bar or space of the 1D barcode.

In a yet further aspect of the present invention, the reflectance is a worst case reflectance approximation for the combination of the 1D barcode and the 2D barcode.

In a further aspect of the present invention, the 2D barcode selecting step comprises the step of selecting a method of combining the 1D barcode and the 2D barcode based on the reflectance.

In a further aspect of the present invention, the method comprises the step of selecting a spacing of marks in the 2D barcode to vary the reflectance relative to the threshold.

In a further aspect of the present invention, the method comprises the step of selecting a size of marks in the 2D barcode to vary the reflectivity relative to the threshold.

In a further aspect of the present invention, the method comprises the step of selecting a non-white, non-black color to print the 2D barcode in order to vary the reflectivity relative to the threshold.

In a yet further aspect of the present invention, the method comprises the step of selecting a level of gray to print the 2D barcode in order to vary the reflectivity relative to a threshold.

In a further aspect of the present invention, the printing step includes the step of selecting a ratio of dark marks to light marks to control reflectance of the printed 2D barcode combined with the 1D barcode.

In a further aspect of the present invention, the combining step comprises the step of selecting a method of combining based on a worst case reflectance approximation of at least one of a bar of the 1D barcode after the 2D barcode is combined with at least a portion of the 1D barcode bar, and a space of the 1D barcode after the 2D barcode is combined with at least a portion of the 1D barcode space, relative to a threshold reflectance.

In another embodiment, the invention comprises the steps of selecting a 1D barcode for a medium; selecting a multi-dimensional barcode for printing on the medium based on a threshold print contrast, PCS, after the 1D barcode and the multi-dimensional barcode are put together, wherein $PCS=(R_w-R_b)/R_w \times 100\%$, where $R_w$=minimum reflectivity of a space of the 1D barcode, with the multi-dimensional barcode put together therewith, $R_b$=maximum reflectivity of a bar of the 1D barcode with the multi-dimensional barcode put together therewith.

In a yet further embodiment of the present invention, a printing system is provided for printing a 1D barcode and a multi-dimensional barcode in the same area comprising: a printing device; logic for obtaining a 1D bar code and a multi-dimensional barcode to be combined with the 1D bar code; logic for combining the 1D and 2D bar codes to overlap at least in part in an area; and logic for printing with the printing device the user selected multi-dimensional barcode and a 1D barcode in a same area of a medium.

DETAILED DESCRIPTION OF THE PREFERRED EMBODIMENT

The present invention allows 1D bar code to be combined with 2D bar code or a higher dimension bar code. The word "combining" encompasses replacing in whole or in part, averaging, adding, performing an exclusive OR operation to yield a given function, or the use of another convenient algorithm. The 1D bar code may be an existing standard such as UPC code, interleaved 2 of 5, Code 39, Code 128 or any new bar -space pattern. 2D bar code in the present context, means any combination of marks covering an area on a given medium and providing information in two dimensions. 2D bar code could be an existing standard or a new encoding. The term 2D bar code marks encompass any individual marks formed into a pattern such as hexagon, circles, matrices, or any other convenient pattern.

A critical aspect of the present invention is that when 1D bar code and 2D or higher dimension bar code are combined and printed in the same space, the print contrast of the encoded data must be great enough for the 1D bar code scanner to detect a difference between light and dark bars.

A typical method that may be utilized to implement the present invention comprises obtaining a 1D bar code for an area of a medium; selecting a 2D bar code or a multi-dimensional bar code for combining with at least a portion of the 1D bar code in the area of the medium based on a reflectance of at least one of a bar of the 1D bar code after the 2D bar code is combined with at least a portion of the 1D bar code bar, and a space of the 1D bar code after the 2D bar code is combined with at least a portion of the 1D bar code space, relative to a threshold reflectance; and printing the 2D bar code combined with the 1D bar code in the area of the medium. This selection of the 2D bar code can be accomplished empirically by obtaining a measurement of reflectance for various selected 2D bar code codes combined with 1D bar codes through the use of a reflectance meter. A typical reflectance meter that may be utilized is a micro reflectometer of the type shown at page 16 of Application Note 1013, "Elements of a Bar Code System" by Hewlett Packard. To facilitate such a measurement, the user would typically select the medium on which the printing was to take place, the ink for the printing, and an acceptable threshold for a minimum contrast. A typical threshold contrast that might be chosen would be 70%. As is well known, aspects of media selection for typical media such as labels, cards, documents, paper, cardboard, plastic, metal, painted surfaces, include surface reflectivity of the media at a specific optical wavelength and the radiation pattern therefrom. An additional optical parameter for consideration by the user is the transparency or translucency of the medium. Other characteristics of importance include durability of the media.

Optimally, the medium should reflect approximately 70% of the incident light. Optimum threshold chosen typically range between 70% and 100% of the incident light reflection.

A second important optical parameter for consideration is the wavelength of the emitter to be used in the scanner. Typical hand held bar code reader wands contain a LED emitter which has a wavelength of either 633 nm, 700 nm, 820 nm, or 930 nm. The wavelength of the emitter is important in determining the PCS of the symbol (to be discussed below). In general, infrared emitters (930 nm) require the use of carbon based inks, while visible red emitters (633 nm or 700 nm) can be used with carbon based inks, dye based black inks, or colored inks. Near-infrared emitters (820 nm) are commonly used in conjunction with carbon based inks, but they are also sensitive to many dye based black inks. Once the scanner wavelength is known, the proper ink can be selected and the PCS of the symbol can be determined. A further aspect of the design of an optical system is the optical parameter called depth of field. This parameter can be described as the maximum vertical distance at which the wand can be held above the symbol while scanning. When combined with the tip geometry of the reader, this parameter will determine the maximum scan angle for the wand.

One method in accordance with the present invention for determining whether the print contrast PCS of the encoded data is great enough for the 1D bar code scanner to detect a difference between light and dark bars is to require the print contrast PCS to equal or exceed a pre-determined threshold such as 70%. In one aspect, the print contrast signal PCS is defined as follows:

$$PCS = (R_w - R_b)/R_w \times 100\%$$

Where:
$R_w$=minimum reflectivity of the media (spaces) including any 2D encoding marks.
$R_b$=maximum reflectivity of the ink (bars), including any 2D encoding marks.

If the 2D information is encoded in the bars of a 1D bar code, then the worst case average reflectance of any given circle of diameter $D_a$ within a bar code bar must be less than or equal to $R_b$, where: $D_a$=spot size or aperture size of the light emitter for the 1D bar code scanner.

Similarly, if 2D information is encoded between the bars of the 1D bar code, then the worst case average reflectance of any given circle of diameter $D_a$ in a space between bar code bars must be greater than or equal to $R_w$. Note that the electrical characteristics of the 1D bar code scanner might prevent the reflectance within a circle of diameter $D_a$ from being an exact function of the light and dark areas.

Reflectance may be controlled by controlling the size of spacing or color of the 2D marks disposed in the 1D barcode. For example, a 2D encoding that uses white marks on black bars of a 1D bar code would need to guarantee that the white marks are small enough or far enough apart to avoid raising the reflectivity of the bar above the threshold, and vice versa for black marks on a space. Note that a 2D encoding that uses gray marks on the black bars of a 1D bar code would reduce reflectance and thus would permit marks that are closer, more frequent, or larger than white marks could otherwise be. Alternatively, reflectance may be controlled by selecting a 2D bar code which has the least number of white dots to the black bar, or the least number of dark spots per space, to thereby have the least effect on the reflectivity of the 1D bar code bar or space. Reflectance may be controlled by using a combination of the foregoing techniques or some other convenient technique.

It should be noted that the gray color referenced above could be achieved simply by averaging the values of the two codes designated for a given pixel. Alternatively, if one pixel in a 1D bar is at a value indicating black, and the same pixel for the 2D bar code is designated with a value indicating light, than a pre-determined shade of gray could be generated at the printer. Alternatively, other colors of printing ink could be utilized in this instance. Note that complimentary color may be utilized. The same averaging process could also be utilized for the spaces of the 1D bar code, or a predetermined selection process could be used wherein if the pixel value for the 1D space indicates light, and the pixel value for the 2D mark indicates dark, then a particular shade of gray or a particular color could be designated and printed. A function could also be designed to generate a particular shade of gray or another color depending on the ordering of light and dark marks in the 2D bar code or based on some other convenient parameter.

Figure 1:
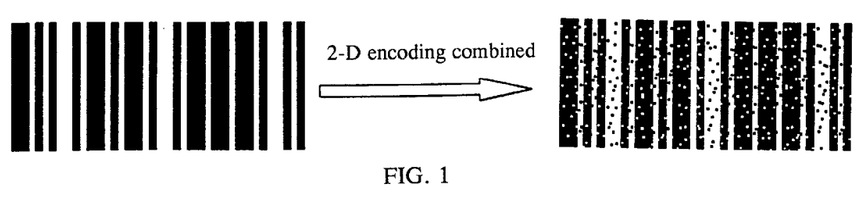
FIG. 1 is a schematic diagram showing a first example of a 1D bar code on the left, and that same 1D bar code with 2D bar code combined therewith on the right.
Figure 2:
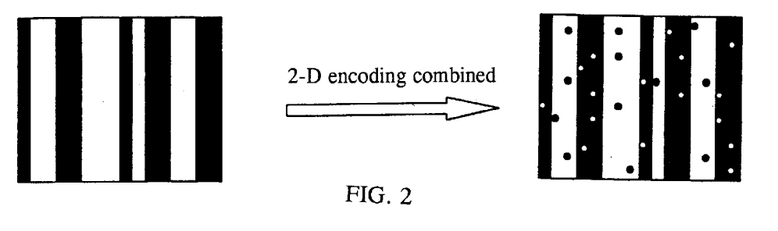
FIG. 2 is a schematic diagram showing a second example of a 1D bar code on the left, and the same 1D bar code with 2D bar code combined therewith on the right.
Figure 3:
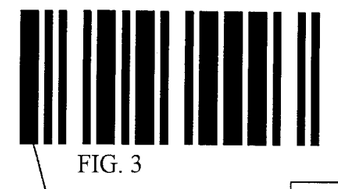
FIG. 3 is a schematic diagram showing a 1D bar code of the letters A, B, C.
Figure 4:
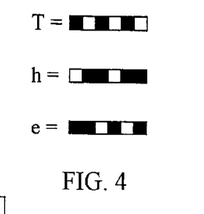
FIG. 4 is a schematic diagram showing a hypothetical 2D encoding for three different letters, T, h, and e.
Figure 5:
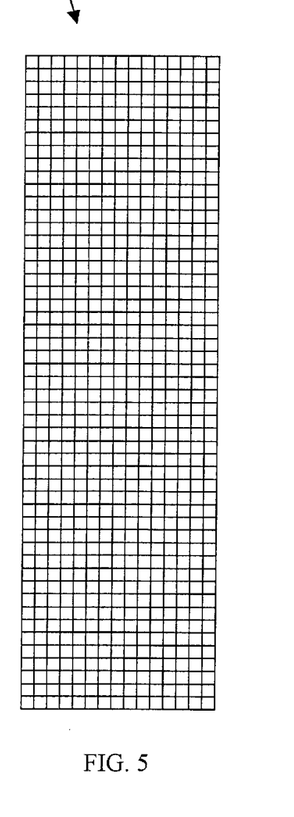
FIG. 5 is a schematic diagram showing one bar of a 1D bar code magnified to show the location of pixels or groups of pixels.
Figure 6:
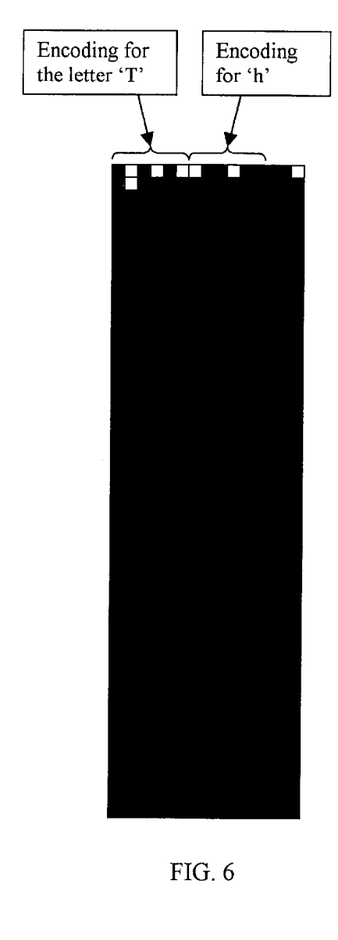
FIG. 6 is a schematic diagram showing a hypothetical implementation where every bit or pixel of an original black 1D bar code bar is to be replaced by 2D encodings. Only the top section of the bar is shown replaced for convenience of illustration. A left-to-right wrap-around ordering is utilized in the figure.
Figure 7:
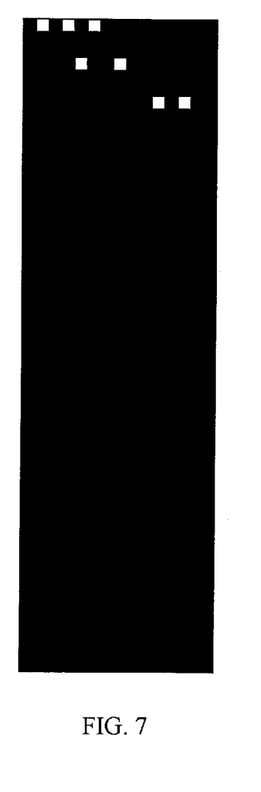
FIG. 7 is a schematic diagram showing a hypothetical implementation of an original black 1D bar code bar combined with a 2D encoding, where not all of the original black 1D bar code bar is replaced by 2D bar code.

Referring now to the figures, FIGS. 1 and 2 show the basic concept of combining 1D and 2D bar codes. FIG. 3 shows a bar code representing the letters A, B, and C, while FIG. 4 shows a hypothetical 2D bar code for the letters T, h and e. FIG. 5 magnifies one of the bars of the 1D bar code to examine the pixels or group of pixels in the bar. FIG. 6 shows a hypothetical implementation where every bit of the original black 1D bar code bar is replaced by a 2D encoding. A left-to-right wrap-around is arbitrarily chosen for the ordering of the data. Note that only the top portion of the bar is completely replaced in the figure, for ease of illustration. FIG. 7 shows a hypothetical implementation of a 1D black bar wherein only a portion thereof is replaced by 2D bar code. It should be noted that instead of replacing portions of the 1D bar code bar or 1D bar code space with 2D bar code, the 2D bar code could instead be either added to the 1D bar code bar or space using averaging as noted above, or combined using an alternative function designed to insert predetermined colors.

Figure 8:
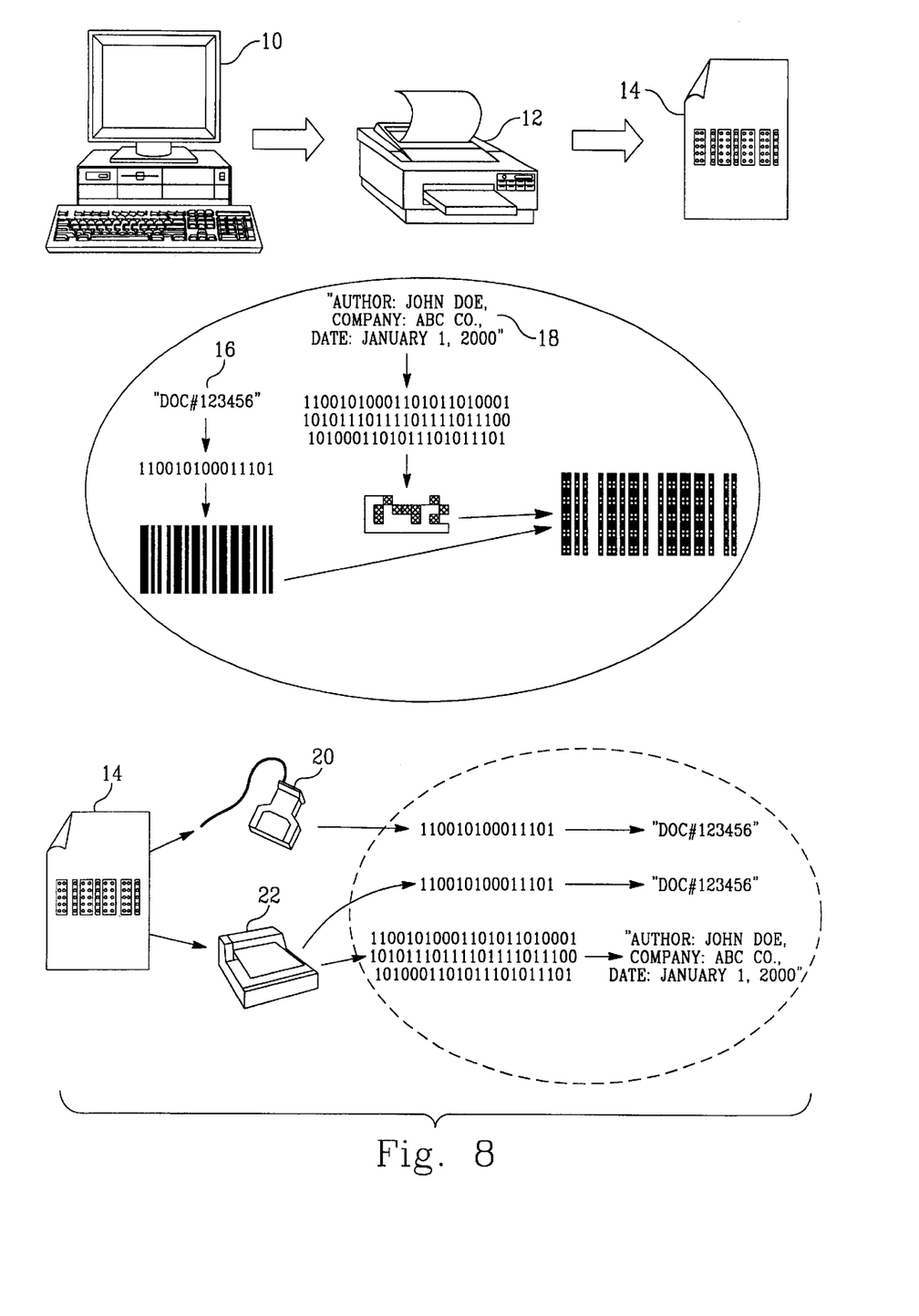
FIG. 8 is a schematic diagram showing the sequence of operations of the present invention.

FIG. 8 shows the basic set up of the present invention wherein a PC or other computing resource 10 could be utilized to combine the 1D bar code with 2D bar code and then print the combined bar code on a printing device 12.

The resulting combined 1D and 2D bar codes are shown printed on a media 14.

Typically, the operation will begin with the generation of a first amount of data for representation by a 1D bar code. This is shown in FIG. 8 for a first amount of data 16 representing a document number "123456." This document number is represented as shown in the figure, as 110010100011101 in binary coding. This binary coding is then represented in bar code as shown in FIG. 8. A second step would involve representing a second amount of data 18, which second amount of data is larger than the first amount of data. This second amount of data would be represented by the 2D bar code. By way of example, as shown in FIG. 8 the second amount of data comprises "Author: John Doe, Company: ABC, Co., Date: Jan. 1, 2000." This second amount of data is represented by the binary coding shown in FIG. 8, and is further represented in 2D bar code as shown in FIG. 8. The combination of the 1D and 2D bar codes is shown on media 14.

In the lower portion of FIG. 8, the combined 1D bar code and 2D bar code on the media 14 may be decoded by a hand held scanner 20 to realize the binary coding for document number "123456." Alternatively, a scanner 22 that is capable of reading and decoding 2D bar code is shown at the bottom of the figure. This scanner 22 may have the capability to both decode the 1D bars to realize the document number "123456," as well as obtaining the second amount of data comprising "Author; John Doe, Company; ABC Co., Date; Jan. 1, 2000."

Figure 9:
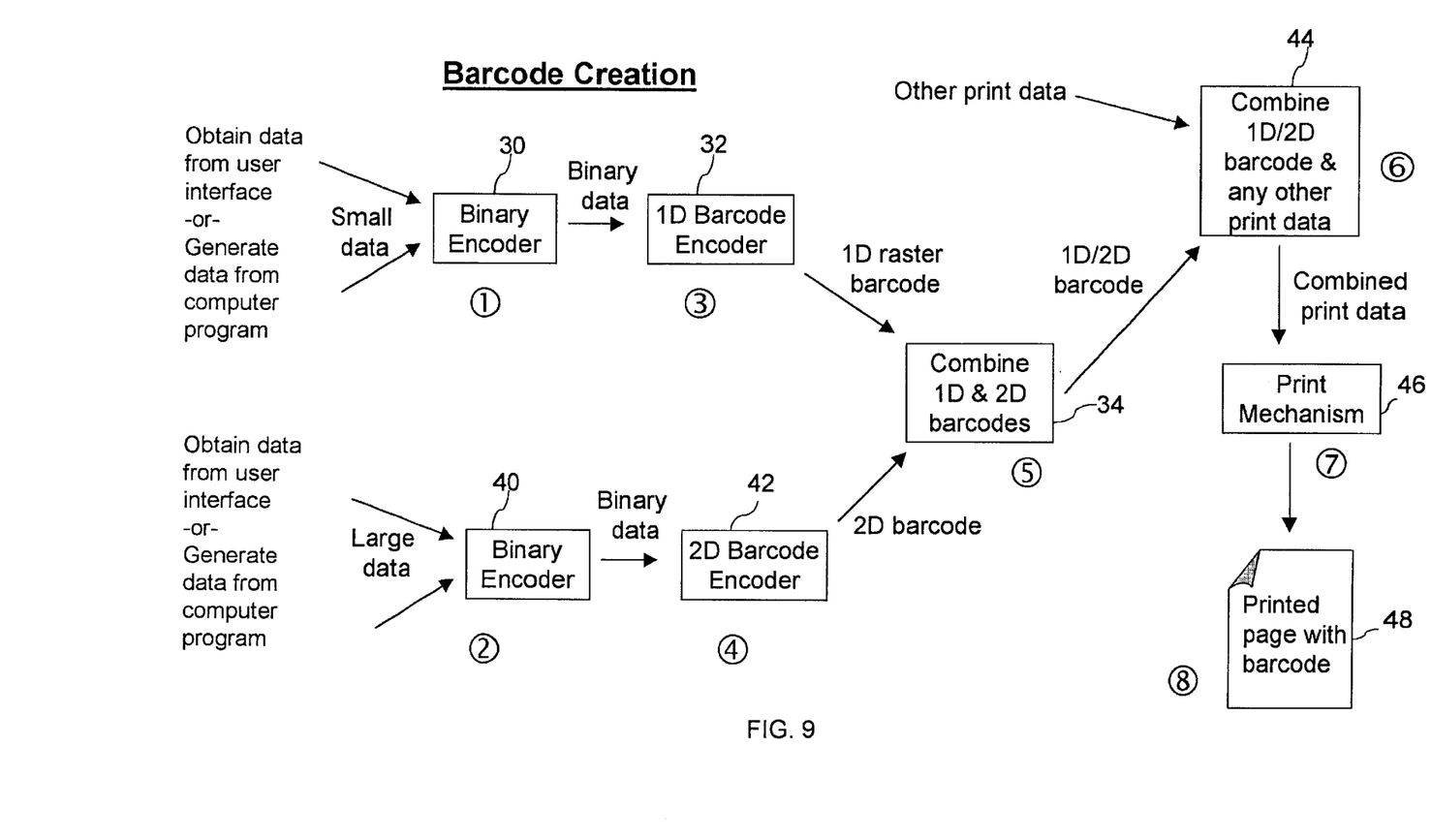
FIG. 9 is a schematic diagram showing the sequence of operations for combining bar codes in accordance with the present invention.

FIG. 9 illustrates a method for bar code creation and combination in schematic fashion. By way of example, a first amount of data, which may be obtained from a user interface or generated from a computer program, is encoded utilizing a binary encoder 30. This binary encoded data is then applied to a 1D bar code encoder 32 wherein it is converted to 1D bar code. 1D raster bar code is then applied as one input to a combining logic 34. Likewise, a second larger amount of data may be obtained from a user interface or generated from a computer program, and encoded in a binary encoder 40. The resulting binary encoded data is then applied to a 2D bar code encoder 42 wherein it is converted to 2D bar code selected in accordance with the present invention. This encoded 2D bar code is then applied as a second input to the combining logic 34. The combining logic 34 may be implemented simply to replace all or a portion of the 1D bars or spaces or both with the 2D bar code. The resulting combined 1D bar code and 2D bar code may then be applied optionally, to a block 44 wherein other print data may be added to be printed in adjacency therewith. The combined data may then be printed in a standard print mechanism 46, resulting in a printed media with the combined 1D and 2D bar codes printed on the same area of the media 48.

Figure 10:
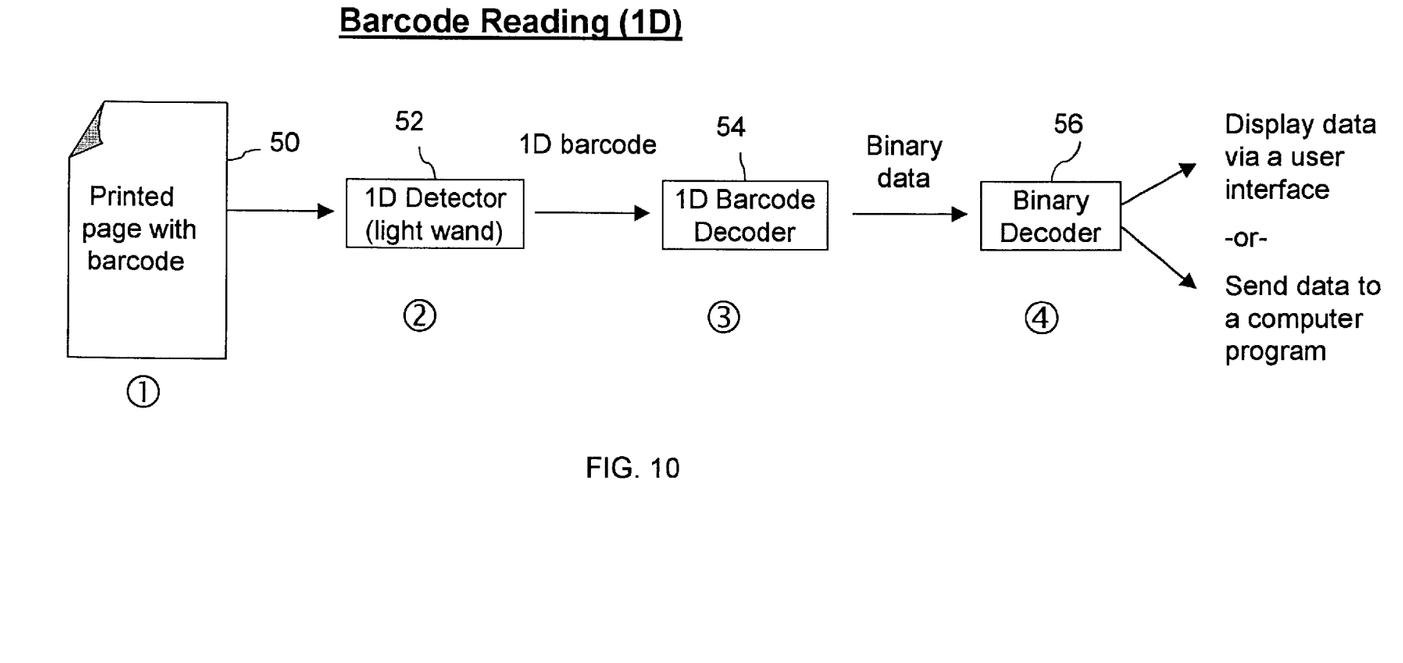
FIG. 10 is a schematic block diagram showing the reading of 1D bar code.

Referring now to FIG. 10, a method for reading 1D bar code is shown. From this method, a printed media 50 with the combined 1D and 2D bar codes printed thereon is scanned either manually or automatically by a 1D detector 52. By way of example, this 1D detector may be implemented by a light wand bar code scanner. The resulting detected 1D bar code is then applied to a 1D bar code decoder 54 which generates decoded binary data therefrom. The resulting binary data is applied to binary decoder 56 which decodes the binary data and then displays that data via a user interface, or sends the data to a computer program or a storage device or some other convenient application.

Figure 11:
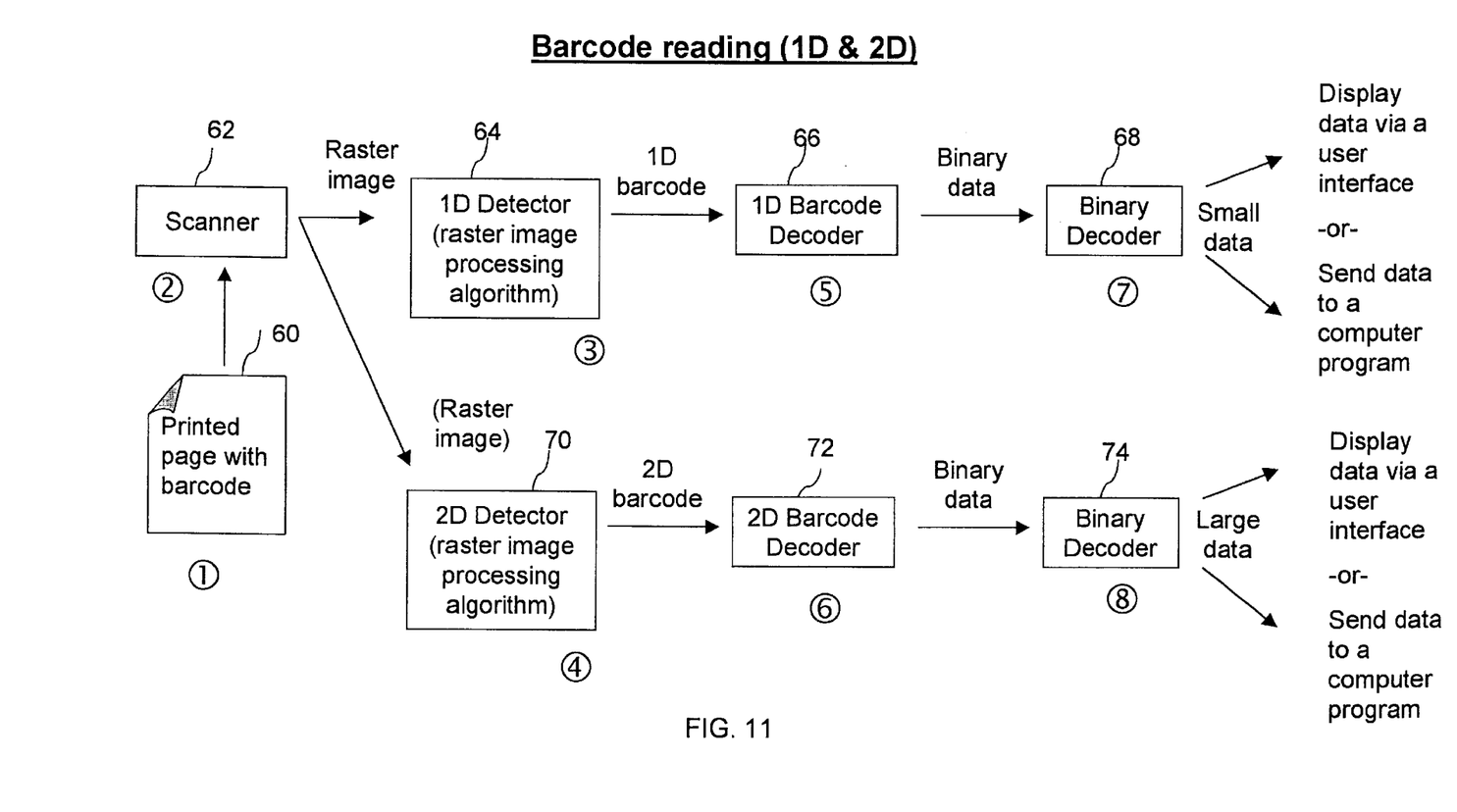
FIG. 11 is a schematic block diagram showing the reading of both 1D and 2D bar codes.

Referring now to FIG. 11, there is shown a method for reading 1D and 2D bar codes using a scanner 62. In this respect, a media printed with the combined 1D and 2D bar codes 60 is scanned in a scanner 62. The raster image resulting from this scanner is applied to 1D detector 64 which processes the raster image in accordance with standard algorithms to obtain a 1D bar code. The resulting 1D bar code output is applied to a 1D bar code decoder 66, which decodes the 1D bar code into binary data. The resulting binary data is then applied to a binary decoder 68, which decodes the binary data and then displays the data via a user interface, or send the data to a computer program, or to a storage device, or another convenient application. Additionally, the raster image is also applied to a 2D detector 70 which processes the raster image using a standard 2D algorithm to realize 2D bar code. The resulting 2D bar code is then applied to a 2D bar code decoder 72 to yield binary data. The binary data is then applied to a binary data decoder 74 to decode this second amount of data for display via a user interface, or to send this second amount of data to a computer program, or a storage device, or some other convenient application.

Figure 12:
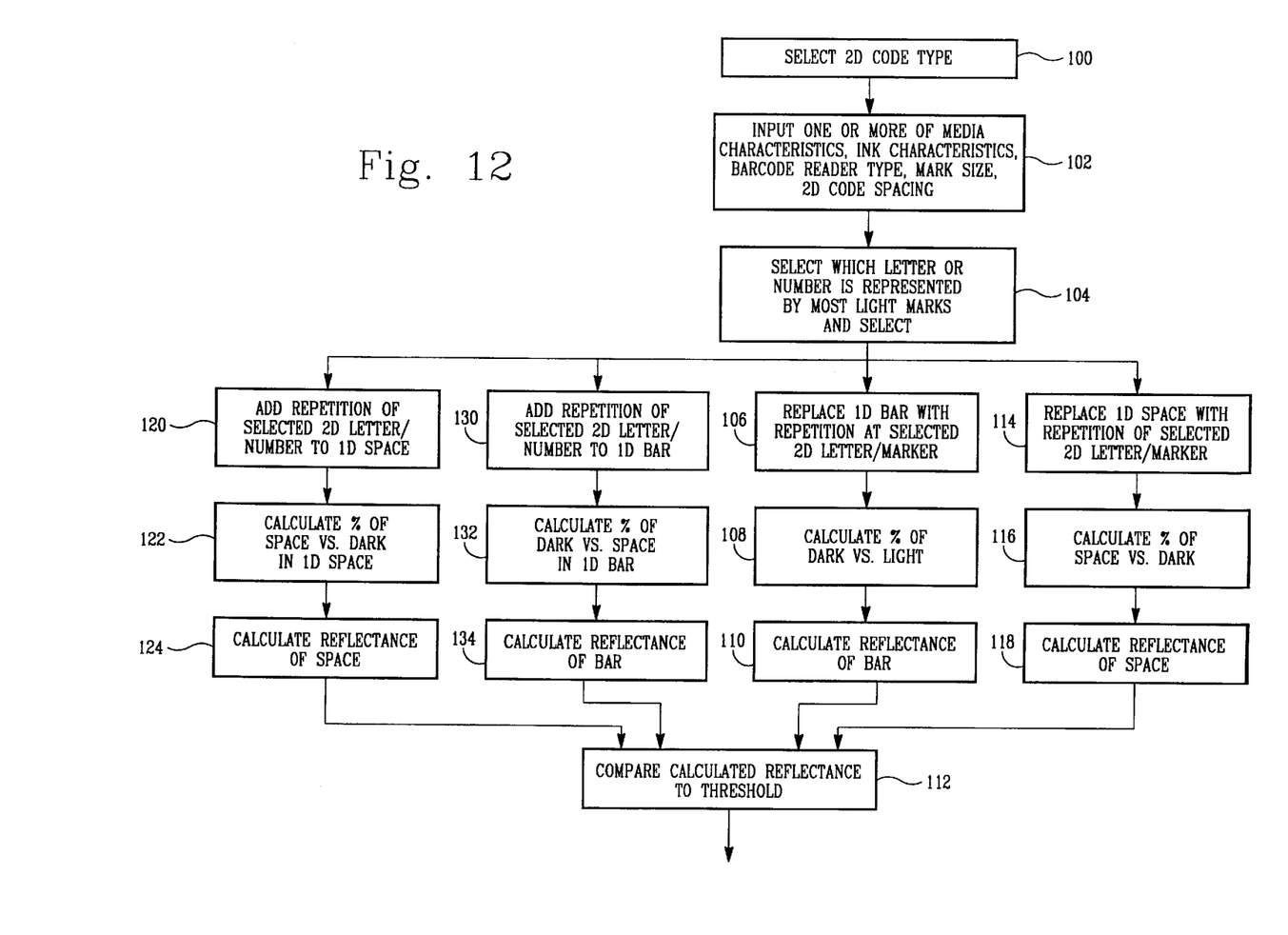
FIG. 12 is a schematic block diagram showing one method of implementing a computer program to select 2D bar code based on acceptable reflectance values.

Referring now to FIG. 12, there is shown one embodiment of a computer program which may be utilized to select 2D bar code based on a reflectance parameter, and a user selection of media characteristics, and/or ink characteristics, and/or bar code reader type, and/or bar code reader spot size, and/or 2D code spacing or ordering of 2D spots or selecting of a ratio of dark spots to light spots. Referring to the figure, the user may select a 2D code type in block 100. Alternatively, a computer program may automatically select a 2D code type from a list of 2D code types. As the next step in the execution of the program, the user or a computer program would select one or more of the media characteristics such as, the ink characteristic, the bar code reader type, the spot size for the bar code reader, the 2D code spacing, the ratio of dark marks to light marks in the 2D bar code, the ordering of dark marks to light marks in the 2D bar code. Note that all of these selected items in this block 102 will affect reflectivity.

The program execution then moves to block 104 to begin the determination of a reflectance characteristic of the 2D code selected in block 100. By way of example, but not by way of limitation, block 104 determines which letter or number in the 2D code selected in block 100 is represented by the most light and/or dark marks. This is one approach to determining an approximation for a worst case reflectance for a given choice of 2D bar code. Although this is a preferred implementation for such an approximation, other algorithms may be used, such as character frequency algorithms, in order to facilitate a worst case approximation. Note that the worst case approximation may also depend on or be determined based on the type of data to be detected, or the type of application and the consequences of a misread. The present invention is not limited to the use of any particular worst case reflectance approximation.

The execution of the program then moves to block 106, wherein all or a portion of a 1D bar code bar is replaced with a repetition of the selected 2D letter/number. The execution then moves to block 108 wherein the percentage of the dark vs. light marks is calculated for the bar. Then the execution moves to block 110 wherein a reflectance for that calculated percentage is determined for that bar. By way of example only, this calculation may be accomplished by the following equation.

$$\text{Reflectance} = (P_d \times R_d) + ((1-P_d) \times R_L)$$

Where:
$P_d$=Percentage of area within a circle of diameter $D_a$ (as defined earlier) that contains dark marks, $R_d$=Reflectance of dark marks (typically the reflectance of toner or ink)

$R_L$=Reflectance of light marks (typically the reflectance of the medium).

The worst case average reflectance approximation is the highest reflectance value (computed as described in the previous equation) that can be computed within any given circle of diameter $D_a$ (as defined earlier) on the 1D bar code bar. The equation is appropriate when the 1D bar is being replaced or combined with a 2D bar code.

The execution of the program then moves to block 112 wherein the calculated reflectance is compared to a threshold to determine if it is less than or equal to the threshold.

At the same time or sequentially, the execution may move to block 114 to replace all or a portion of a 1D space with a repetition of the selected 2D letter/number. The execution would then move to block 116 wherein the percentage of the space vs. dark is calculated for this 1D space. Then the execution moves to block 118 wherein the reflectance is calculated, as described above, and the resulting calculating reflectance is compared to a threshold during the execution of block 112 to determine if it is greater than or equal to the threshold.

Likewise, at the same time, or sequentially, the execution may move to block 120 wherein a repetition of the selected letter or number is added by an averaging operation, or by a standard adding procedure to all or a portion of a 1D space for a 1D bar code. The resulting addition may result in a shade of gray or other color marks in the 1D bar code. The execution would then move to block 122 wherein the percentage of the space vs. dark for the 1D space is calculated. Then the execution moves to block 124 wherein the reflectance of the space is calculated. Then the execution moves to block 112 wherein the calculated reflectance of the space is compared to a threshold to determine if it is greater than or equal to the threshold.

Likewise, the execution may move at the same time, or sequentially to the block 130 wherein a repetition of the selected 2D letter/number is added by a standard adding sequence, or by an averaging operation, or by another convenient mechanism to a 1D bar of a 1D bar code. The resulting addition may result in gray or other color marks in the 1D bar code. The execution then moves to block 132 wherein the percentage of the dark vs. space in the 1D bar is calculated. Then the execution moves to block 134 wherein the reflectance is calculated, as discussed above. Then the execution moves to block 112 wherein the calculated reflectance of the bar is compared to a threshold to determine if it is less than or equal to the threshold.

It should be noted that the present invention is not limited to the use of all of the replacement or addition blocks 106, 114, 120, and 130 and their subsequent calculation steps. By way of example, only a single replacement or addition step may be utilized with its following calculation sequence of steps.

The execution then moves to block 140 wherein the 2D bar code types and the various other selected parameters for acceptable reflectance values are saved. The execution then moves to block 142 wherein it is determined whether there are other 2D bar codes to be tested. If the answer is YES, then the execution moves back to block 100 and a different 2D bar code type is selected, and a second iteration of calculations is performed. If the answer is NO for block 142, then the execution moves to block 146 wherein a selection is made of a 2D bar code based on acceptable reflectance values. The user or a computer may select the 2D bar code based simply on the best reflectance value. Alternatively, a selection hierarchy can be set up based on a preferred media characteristic, a preferred ink characteristic, a preferred bar code reader type, a preferred mark size, a preferred 2D code spacing, or some combination thereof.

It should be noted that the foregoing program may be also designed to operate iteratively to calculate reflectances for a series of different media characteristics, ink characteristics, bar code reader types, mark size, 2D code spacing, or a combination thereof. The iterations would be facilitated simply by including one or more additional diamond 144 decision blocks in the execution stream to determine if there are other media, bar code reader types, mark sizes, mark spacing parameters or any other convenient parameters to be tested. If the answer is YES, then the execution moves back to block 102 and a new media type, or ink characteristic, or bar code reader type, or mark size, or mark spacing, or other convenient parameter is selected and the execution proceeds through another iteration of reflectance calculations.

Figure 13:
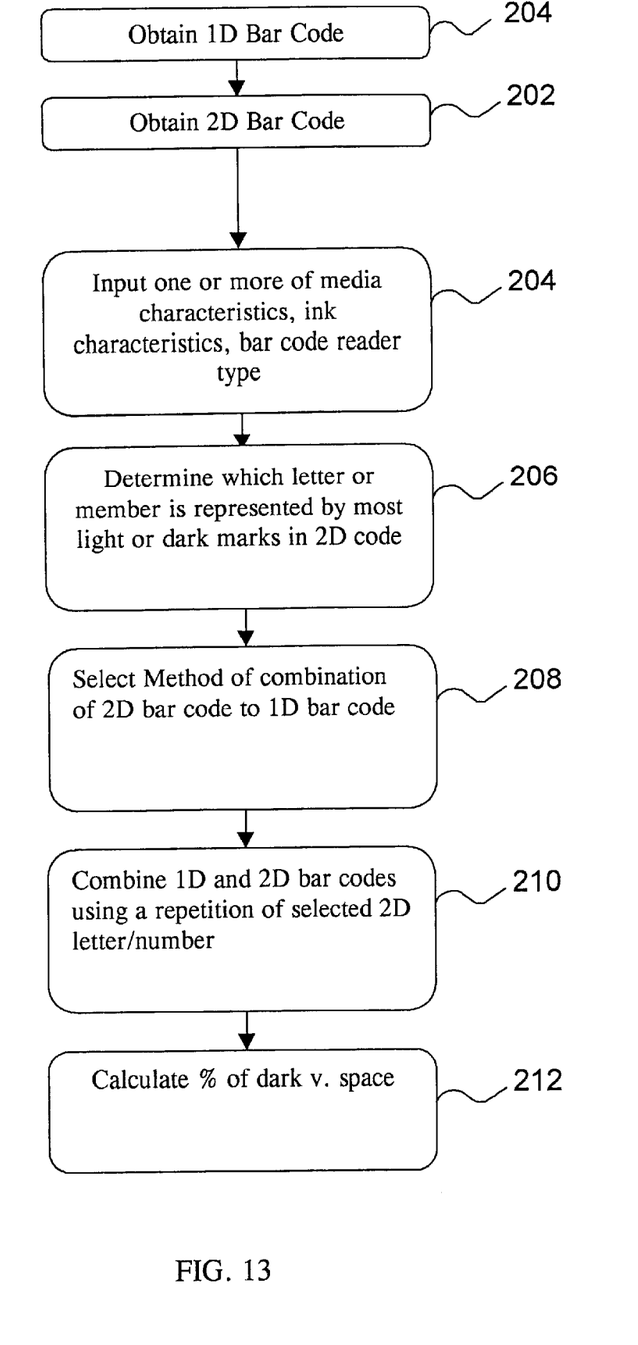
FIG. 13 is a schematic block diagram showing a different method of implementing a computer program to combine 1D and 2D bar code.

As an alternative embodiment, the present invention could be implemented by selecting a preferred 2D bar code based on another criteria besides reflectance, and then selecting a method of combining the 1D and 2D bar codes in order to optimize reflectance relative to a threshold reflectance. The flow chart execution for such a computer program is shown in FIG. 13. Referring to that figure, the execution first moves to block 200, wherein a 1D bar code is chosen. Then the execution obtains a 2D bar code in block 202. At this point various parameters may be chosen such the media characteristics, the ink characteristics, the bar code reader type, and other appropriate parameters in block 204. The execution then moves to block 206 to determine the letter or number which would present the worst case in terms of affecting reflectance of the combined 1D and 2D bar codes, if the entire 2D bar code represents a repetition of this character. (Note that although this is a preferred implementation, other algorithms may be used, such as character frequency algorithms, in order to facilitate a worst case approximation. As noted for the embodiment of FIG. 12, the present invention is not limited to the use of any particular worst case approximation algorithm.)

The execution then moves to block 208, wherein a method of combining 1D and 2D bar codes is selected. The method should be selected in order to ensure that reflectance is acceptable for the combination of the 1D and 2D codes using the worst case approximation relative to a threshold. By way of example, the method of combination could be a complete replacement of a bar or a space, or a combination with the 2D bar code. Alternatively, the method could comprise a partial replacement of 1D bars or spaces with the 2D bar code. The method could also comprise the addition of the 2D bar code to the 1D bar code in accordance with a preferred algorithm. The method could also comprise using averaging operation for each pixel as described previously, wherein one input is the value of the pixel for the 1D bar code and the other input is the value of the pixel for the 2D bar code, or the selection of a predetermined shade of gray or other color is used for that pixel when the inputs are different values. Additionally, the method could comprise a selected spacing of marks of the 2D bar code in order to obtain a desired reflectance relative to a threshold. The method could also comprise varying the size of the marks of the 2D bar code in order to obtain a desired reflectance relative to the threshold. The method could also comprise selecting an ordering of dark marks to light marks in the 2D bar code in order to obtain a desired reflectance relative to the threshold.

The execution then moves to block 210, wherein the 2D bar code representing the chosen worst case approximation of step 206 is combined with the 1D bar code in accordance with the method of combining selected in block 208. The execution then calculates the percentage of dark to light for a predetermined bar code reader spot size in block 212. Then the reflectance of the combined 1D and 2D bar codes is calculated using an equation such as is used for block 110 in FIG. 12 in block 214. The execution then compares the calculated reflectance from block 214 to a threshold reflectance in block 216. If the calculated reflectance is acceptable relative to the threshold, then the combination method and the chosen parameters and the reflectance value are stored in block 218. The execution then determines in block 220 whether there are any more combination methods to test. If the answer to YES, then the execution moves back to block 208 and a different method of combining 1D and 2D bar code is selected, the execution performs the same set of steps as previously described.

If the answer is NO in decision block 220, then the execution moves to decision block 222, wherein it is determined whether the worst reflectance approximation test is to be run with any different parameters, such as a different medium characteristic, or a different ink characteristic, or a different bar code reader type. If the answer at this decision block 222 is YES, then the execution moves to 204, and the execution performs another iteration of calculations to determine a reflectance value and compare it to the threshold. If the answer at the decision block 222 is NO, then the execution moves to block 224 wherein a method of combining the 1D and 2D bar codes is selected from among the combining methods with acceptable reflectance values relative to the threshold.

It should be noted that although the present invention has been described in the context of a computer program wherein reflectance is calculated in a particular execution sequence, the present invention is not limited to that particular execution sequence. The sequencing of when various calculations occur is a parameter which may be varied to optimize the operation of the program. Additionally, it should be noted that the present invention is not limited to the particular equation for calculating the PCS value or the particular equation used for calculating the worst case average reflectance value. These are example equations used to illustrate the basic concept of utilizing a selected parameter to determine which coed from a plurality of 2D bar codes to combine with a 1D bar code in order to facilitate the reading of both the 1D and the 2D bar codes.

Accordingly, it can be seen at the present invention is particularly advantageous for use in optimizing printing operations when both a 1D bar code and a 2D bar code are to be printed on a given substrate or medium. Additionally, the present invention is particularly advantageous for combining a 1D bar code and a 2D bar code when space is at a premium.

The foregoing description of a preferred embodiment of the invention has been presented for purposes of illustration and description. It is not intended to be exhaustive or to limit the invention to the precise form disclosed, and modifications and variations are possible in light in the above teachings or may be acquired from practice of the invention. The embodiment was chosen and described in order to explain the principles of the invention and as practical application to enable one skilled in the art to utilize the invention in various embodiments and with various modifications are suited to the particular use contemplated. It is intended that the scope of the invention be defined by the claims appended hereto and their equivalents.

What is claimed is:

1. A method for printing barcode, comprising the steps of: obtaining a 1D barcode for an area of a medium; obtaining a 2D bar code; combining said 1D and 2D bar codes in said area to overlap at least in part; and printing the combination of said 2D barcode with said 1D barcode in said area of said medium; wherein said 2D bar code obtaining step comprises the step of selecting a 2D barcode for combining with at least a portion of said 1D barcode in said area of said medium based on a reflectance of at least one of a bar of said 1D barcode after said 2D barcode is combined with at least a portion of said 1D barcode bar, and a space of said 1D barcode after said 2D barcode is combined with at least a portion of said 1D barcode space, relative to a threshold reflectance.

2. A method as defined in claim 1, further comprising the steps of: representing a first amount of data by said 1D barcode; and, representing a second amount of data, which second amount is larger than said first amount, by said 2D barcode.

3. A method as defined in claim 1, wherein said reflectance in said selecting a 2D barcode step is determined for an addition of said 2D barcode to at least a portion of said bar or space of said 1D barcode.

4. A method as defined in claim 1, wherein said reflectance in said selecting a 2D barcode step is determined for said 2D barcode replacing at least a portion of said bar or space of said 1D barcode.

5. A method as defined in claim 1, wherein said step of selecting said 2D barcode comprises the step of selecting one of said 1D barcode bar and said 1D barcode space to combine with said 2D barcode, based on said reflectance of said bar after replacing of a portion thereof with said 2D barcode as compared to said reflectance of said space after said replacing a portion thereof with said 2D barcode.

6. A method as defined in claim 3, wherein said reflectance is a worst case reflectance approximation for the combination of said 1D barcode and said 2D barcode.

7. A method as defined in claim 1, wherein said reflectance is a worst case reflectance approximation for the combination of said 1D barcode and said 2D barcode.

8. A method as defined in claim 1, wherein said threshold is set based on a selection of a medium.

9. A method as defined in claim 1, wherein said threshold is set based on a selection of barcode detector wavelength.

10. A method as defined in claim 1, wherein said threshold is set based on a spot size of a barcode reader.

11. A method as defined in claim 1, wherein said threshold is set based on depth of field of a barcode reader.

12. A method as defined in claim 1, wherein said reflectance is for a given spot size of a barcode reader.

13. A method as defined in claim 1, wherein said 2D barcode selecting step comprises the step of selecting a method of combining said 1D barcode and said 2D barcode based on said reflectance.

14. A method as defined in claim 1, further comprising the step of
   selecting a spacing of marks in said 2D barcode to vary said reflectance relative to said threshold.

15. A method as defined in claim 1, further comprising the step of selecting a size of marks in said 2D barcode to vary said reflectivity relative to said threshold.

16. A method as defined in claim 1, further comprising the step of selecting a non-white, non-black color to print said 2D barcode in order to vary said reflectivity relative to said threshold.

17. A method as defined in claim 1, further comprising the step of selecting a level of gray to print said 2D barcode in order to vary said reflectivity relative to a threshold.

18. A method as defined in claim 1, wherein said printing step includes the step of selecting a ratio of dark marks to light marks to control reflectance of said printed 2D barcode combined with said 1D barcode.

19. A method as defined in claim 1, wherein said printing step comprises the step of selecting an ordering of dark marks to light marks to control reflectance of said printed 2D barcode combined with said 1D barcode.

20. A method as defined in claim 1, wherein said combining step comprises the step of selecting a method of combining based on a worst case reflectance approximation of at least one of a bar of said 1D barcode after said 2D barcode is combined with at least a portion of said 1D barcode bar, and a space of said 1D barcode after said 2D barcode is combined with at least a portion of said 1D barcode space, relative to a threshold reflectance.

21. A method as defined in claim 20, wherein said selecting a method of combining comprises combining by addition of said 2D bar code to said 1D bar code.

22. A method as defined in claim 20, wherein said selecting a method of combining comprises combining by replacing a portion of said 1D bar code with said 2D barcode.

23. A method as defined in claim 20, wherein said selecting a method of combining comprises the step of replacing substantially all of said 1D bar code with said 2D bar code.

24. A method as defined in claim 20, wherein said selecting a method of combining step comprises selecting a spacing of marks in said 2D barcode to vary reflectancez of the combination relative to a threshold.

25. A method as defined in claim 20, wherein said selecting a method of combining step comprises selecting a size of marks in said 2D bar code to vary reflectance of the combination relative to a threshold.

26. A method as defined in claim 20, wherein said selecting a method of combining step comprises selecting a ratio of dark marks to light marks to control reflectance of the combination relative to a threshold.

27. A method as defined in claim 20, wherein said step of selecting a method of combining comprises selecting an ordering of light and dark marks to control reflectance of the combination relative to a threshold.

28. A method for encoding barcode, comprising the steps of:
  selecting a 1D barcode for a medium;
  selecting a multi-dimensional barcode for printing on said medium based on a threshold print contrast, PCS, after said 1D barcode and said multi-dimensional barcode are put together, wherein $PCS=(R_w-R_b)/R_w \times 100\%$, where
  $R_w$=minimum reflectivity of a space of said 1D barcode, with said multi-dimensional barcode put together therewith,
  $R_b$=maximum reflectivity of a bar of said 1D barcode with said multi-dimensional barcode put together therewith.

29. A method as defined in claim 28, wherein said multi-dimensional barcode is a 2D barcode.

30. A method as defined in claim 28, wherein a worst case average reflectance of a spot from a barcode reader disposed on said bar is less than or equal to $R_b$.

31. A method as defined in claim 28, wherein a average reflectance from a spot from a barcode reader, with the spot disposed on said space is greater than or equal to $R_w$.

32. A printing system for printing a 1D barcode and a multi-dimensional barcode in the same area comprising:
  a printing device;
  logic for obtaining a 1D bar code and a multi-dimensional barcode to be combined with said 1D bar code;
  logic for combining said 1D and 2D bar codes to overlap at least in part in an area; and logic for printing with said printing device said user selected multidimensional barcode and a 1D barcode in a same area of a medium, wherein said combined 1D bar code and 2D bar code on the medium has a reflectance from at least one of a bar of said 1D barcode after said 2D barcode is combined with at least a portion of said 1D barcode bar, and a space of said 1D barcode after said 2D barcode is combined with at least a portion of said 1D barcode space, that meets or exceeds a threshold reflectance.

33. A method for representing a first and a second amount of data by two different barcode, respectively, in the same area, comprising the steps of:
  representing a first amount of data by a 1D barcode;
  representing a second amount of data, which second amount is greater than said first amount, by a 2D barcode;
  combining said 1D barcode and said 2D barcode to overlap at least in part; and
  printing said combined barcodes on a medium, wherein said 2D bar code representing step comprises selecting a 2D barcode for combining with at least a portion of said 1D barcode in said area of said medium based on a reflectance of at least one of a bar of said 1D barcode after said 2D barcode is combined with at least a portion of said 1D barcode bar, and a space of said 1D barcode after said 2D barcode is combined with at least a portion of said 1D barcode space, relative to a threshold reflectance.

* * * * *